(12) United States Patent
Hsia

(10) Patent No.: US 11,116,057 B2
(45) Date of Patent: Sep. 7, 2021

(54) SOLID-STATE LIGHTING WITH REMOTE CONTROLS

(71) Applicant: Aleddra Inc., Renton, WA (US)

(72) Inventor: Chungho Hsia, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 0 days.

(21) Appl. No.: 16/929,540

(22) Filed: Jul. 15, 2020

(65) Prior Publication Data

US 2020/0351997 A1   Nov. 5, 2020

Related U.S. Application Data

(63) Continuation-in-part of application No. 16/904,206, filed on Jun. 17, 2020, which is a continuation-in-part of application No. 16/880,375, filed on May 21, 2020, which is a continuation-in-part of application No. 16/861,137, filed on Apr. 28, 2020, now Pat. No. 10,992,161, which is a continuation-in-part of application No. 16/830,198, filed on Mar. 25, 2020, now Pat. No. 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No.
(Continued)

(51) Int. Cl.
| | |
|---|---|
| *G05F 1/00* | (2006.01) |
| *H05B 45/31* | (2020.01) |
| *H05B 47/19* | (2020.01) |
| *H05B 45/10* | (2020.01) |
| *F21K 9/278* | (2016.01) |

(52) U.S. Cl.
CPC ............. *H05B 45/31* (2020.01); *F21K 9/278* (2016.08); *H05B 45/10* (2020.01); *H05B 47/19* (2020.01)

(58) Field of Classification Search
CPC ........ H05B 45/31; H05B 47/19; H05B 45/10; H05B 45/325; H05B 45/37; F21K 9/278; Y02B 20/30; H02J 2207/20; H02J 7/04; H02J 7/00; H02J 7/0031; H02J 7/0048; H02J 7/0068; H02J 7/00714
See application file for complete search history.

(56) References Cited

U.S. PATENT DOCUMENTS 5,099,193 A * 3/1992 Moseley ................ G08C 17/00
  323/324
6,710,546 B2 * 3/2004 Crenshaw ................ H02J 9/02
  315/150

(Continued)

*Primary Examiner* — William J Carter
*Assistant Examiner* — Omar Rojas Cadima
(74) *Attorney, Agent, or Firm* — Han IP PLLC; Andy M. Han

(57) ABSTRACT

A light-emitting diode (LED) luminaire control system comprising a control circuit is adopted to provide remote control signals to operate an external luminaire that comprises LED arrays and a power supply. The LED luminaire control system further comprises a relay switch, a remote controller, and a transceiver circuit. When the remote control signals are initiated by the remote controller with phase-shift keying (PSK) signals transmitted, the transceiver circuit can demodulate such PSK signals and subsequently send decoded commands to the LED luminaire control system to control the luminaire by turning on and off and dimming up and down the external luminaire.

19 Claims, 4 Drawing Sheets

Related U.S. Application Data 10,602,597, which is a continuation-in-part of application No. 16/681,740, filed on Nov. 12, 2019, now Pat. No. 10,959,310, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| RE42,161 E * | 2/2011 | Hochstein | H05B 45/355 |
| | | | 363/89 |
| 8,508,148 B1 * | 8/2013 | Carley | F21V 23/06 |
| | | | 315/291 |

* cited by examiner

SOLID-STATE LIGHTING WITH REMOTE CONTROLS

CROSS-REFERENCE TO RELATED APPLICATIONS

The present disclosure is part of a continuation-in-part (CIP) application of U.S. patent application Ser. No. 16/904,206, filed 17 Jun. 2020, which is part of CIP application of U.S. patent application Ser. No. 16/880,375, filed 21 May 2020, which is part of CIP application of U.S. patent application Ser. No. 16/861,137, filed 28 Apr. 2020, which is part of CIP application of U.S. patent application Ser. No. 16/830,198, filed 25 Mar. 2020, which is part of CIP application of U.S. patent application Ser. No. 16/735,410, filed 6 Jan. 2020 and issued as U.S. Pat. No. 10,660,179 on 19 May 2020, which is part of CIP application of U.S. patent application Ser. No. 16/694,970, filed 25 Nov. 2019 and issued as U.S. Pat. No. 10,602,597 on 24 Mar. 2020, which is part of CIP application of U.S. patent application Ser. No. 16/681,740, filed 12 Nov. 2019, which is part of CIP application of U.S. patent application Ser. No. 16/664,034, filed 25 Oct. 2019 and issued as U.S. Pat. No. 10,660,184 on 19 May 2020, which is part of CIP application of U.S. patent application Ser. No. 16/572,040, filed 16 Sep. 2019 and issued as U.S. Pat. No. 10,645,782 on 5 May 2020, which is part of CIP application of U.S. patent application Ser. No. 16/547,502, filed 21 Aug. 2019 and issued as U.S. Pat. No. 10,485,073 on 19 Nov. 2019, which is part of CIP application of U.S. patent application Ser. No. 16/530,747, filed 2 Aug. 2019 and issued as U.S. Pat. No. 10,492,265 on 26 Nov. 2019, which is part of CIP application of U.S. patent application Ser. No. 16/458,823, filed 1 Jul. 2019 and issued as U.S. Pat. No. 10,485,065 on 10 Nov. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to light-emitting diode (LED) luminaire controls and more particularly to an LED luminaire control system with remote controls, which can turn on and off, and dim up and down a regular luminaire coupled to the LED luminaire control system.

Description of the Related Art

Solid-state lighting from semiconductor LEDs has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an alternate-current (AC) mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, the ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

The AC mains-operable LED luminaires can easily be used with a remote lighting control system, taking advantages of no rewiring needed for remote control. No wiring or rewiring can save dramatic installation cost, and such a lighting control system is free of the wiring errors in contrast to an all wired system that is highly susceptible to such errors. With the acceleration of LED luminaire deployment in the lighting industry, the needs of energy saving, utilization efficiency of lighting energy, and intelligent control of lighting have become very urgent. Traditional wired luminaire controls have drawbacks such as only on-off for manual switch control, susceptibility of the interference by the strong magnetic field from a power line for power carrier control, and failing to meet the requirements of centralized monitoring, recording, and energy management. On the other hand, the lighting industry needs control systems that can not only turn on and off but also dim up and down a regular luminaire coupled to the LED luminaire control system. It is, therefore, a motive to design such an LED luminaire control system incorporating a cost-effective remote control that is simple to implement without commissioning in the field and without wiring and rewiring.

SUMMARY

The integrated LED luminaire comprises a regular luminaire and an LED luminaire control system. The regular luminaire comprises external one or more LED arrays and an external power supply unit that may comprise a pair of dimming ports D+D−. The LED luminaire control system comprises a power supply package comprising two electrical conductors "L" and "N", a power supply converter circuit, and a first voltage converter circuit. The two electrical conductors "L" and "N" are configured to couple to the AC mains. The power supply converter circuit is configured to couple to the two electrical conductors "L" and "N" to convert a line voltage from the AC mains into a first direct-current (DC) voltage. The first voltage converter circuit is configured to convert the first DC voltage into a second DC voltage less than the first DC voltage. The LED luminaire control system further comprises a control circuit comprising a relay switch, which comprises a power sensing coil with a set voltage and a reset voltage and is configured to couple the line voltage from the AC mains to the external power supply unit to operate thereof when enabled, subsequently powering up the external one or more LED arrays coupled with the external power supply unit. The external power supply unit comprises an input operating voltage range such as 100~347 volts (AC or DC). The external power supply unit comprises two electrical conductors "C" and "N". The pair of dimming ports D+D− are configured to receive a 1-to-10 V (volt) DC voltage for luminaire dimming applications. The external power supply unit is a current source, providing an LED driving current to the external one or more LED arrays to dim up or dim down thereof.

The relay switch further comprises a first input electrical terminal and a pair of input electrical terminals, in which the first input electrical terminal is configured to couple to a hot wire (i.e., "L") of the line voltage from the AC mains. The pair of input electrical terminals are coupled to the power sensing coil and configured to receive either the set voltage or the reset voltage and to respectively set up an on-state or an off-state of the relay switch.

The LED luminaire control system further comprises a transceiver circuit comprising a receiver and a decoder and controller. The transceiver circuit is coupled to the control circuit and configured to demodulate various phase-shift keying (PSK) band-pass signals and to output either a first pulse signal or a second pulse signal. Either the first pulse signal or the second pulse signal has a low voltage, not powerful enough to operate the power sensing coil. The control circuit further comprises a driver circuit powered by the first DC voltage and receiving either the first pulse signal or the second pulse signal. The driver circuit is coupled to the power sensing coil and configured to respectively convert the first pulse signal and the second pulse signal into a third pulse signal and a fourth pulse signal that has a reverse polarity with the third pulse signal. Either the third pulse signal or the fourth pulse signal is boosted to reach a level of either the set voltage or the reset voltage, powerful enough to either set or reset the power sensing coil. The relay switch further comprises an output electrical terminal configured to relay the hot wire ("L") of the line voltage from the AC mains to the external power supply unit when the third pulse signal appears at the input electrical terminals to set up the on-state, whereas the relay switch maintains the on-state until the fourth pulse signal is received for the off-state.

The transceiver circuit is further configured to output either a pulse-width modulation (PWM) signal or a complementary PWM signal via the decoder and controller in response to one of the various PSK band-pass signals received by the receiver. Either the PWM signal or the complementary PWM signal is configured to control the external power supply unit by providing an LED driving current to dim up or dim down the external one or more LED arrays. The control circuit further comprises a PWM-to-voltage converter coupled to the transceiver circuit and configured to convert either the PWM signal or the complementary PWM signal into the 1-to-10 V DC voltage in response to one of the various PSK band-pass signals received and to control the external power supply unit by providing an LED driving current to dim up or dim down the external one or more LED arrays. The PWM-to-voltage converter comprises a digital-to-analog converter circuit coupled to the external power supply unit and configured to transform either the PWM signal or the complementary PWM signal into the 1-to-10 V DC voltage to operate a dimming circuit in the external power supply unit.

The PWM-to-voltage converter further comprises an interface circuit coupled between the transceiver circuit and the digital-to-analog converter circuit and configured to buffer either the PWM signal or the complementary PWM signal in a way that the digital-to-analog converter circuit powered by the first DC voltage can be operated without affecting an operation of the transceiver circuit powered by the second DC voltage. The interface circuit may comprise an inverter configured to convert the complementary PWM signal into the PWM signal. The digital-to-analog converter circuit comprises a low-pass filter assembly receiving the PWM signal and configured to first-order smooth out the PWM signal and to convert the PWM signal into the 1-to-10 V DC voltage according to a proportionality set up by two resisters (not shown). The digital-to-analog converter circuit further comprises a transistor coupled between the low-pass filter assembly and the external power supply unit and configured to couple the 1-to-10 V DC voltage to the external power supply unit when the transistor is turned on. The digital-to-analog converter circuit further comprises a second voltage converter circuit configured to boost the first DC voltage into a third DC voltage greater than the first DC voltage. The third DC voltage is configured to set up a bias voltage to turn on the transistor in a way that the 1-to-10 V DC voltage is capable of controlling the external power supply unit without affecting an operation of the PWM-to-voltage converter.

The transceiver circuit further comprises an antenna embedded on a printed circuit board (PCB) and a radio-frequency (RF) front-end transmitter/receiver configured to provide a single-ended matched impedance between an input to the RF front-end transmitter/receiver and an output from the receiver for maximum transmit/receive efficiency. In other words, this important process is designed to ensure signals to transmit without signal reflections and with a required transmission power. The decoder and controller comprises a microcontroller, a microchip, or a programmable logic controller.

The remote controller comprises a remote user interface and a transmitter circuit. The remote controller is configured to send the PSK band-pass signals to the transceiver circuit in response to a plurality of signals generated from the remote user interface. The transmitter circuit comprises a transmitter and an encoder and controller. The encoder and controller is coupled between the remote user interface and the transmitter and configured to convert the plurality of signals into a plurality of sets of binary data characters. Each of the plurality of sets of binary data characters comprises command data.

The remote user interface comprises a plurality of touch-sensitive switches configured to provide the plurality of signals. At least one of the plurality of signals is configured to turn on the external one or more LED arrays via the external power supply unit. At least one of the plurality of signals is configured to turn off the external one or more LED arrays via the external power supply unit. At least one of the plurality of signals is configured to dim up the external one or more LED arrays via the external power supply unit. At least one of the plurality of signals is configured to dim down the external one or more LED arrays via the external power supply unit. That may be to say, at least two of the plurality of signals may be respectively configured to turn on and turn off the external one or more LED arrays via the external power supply unit whereas at least two of the plurality of signals may be respectively configured to dim up and dim down the external one or more LED arrays via the external power supply unit. At least one of the plurality of signals is configured as a transponder signal, wherein, upon receiving the transponder signal, the transceiver circuit sends a response signal in other applications. The transmitter circuit further comprises a voltage regulator with an enable input, the voltage regulator configured to supply a voltage to operate the transmitter in response to an enable signal from the encoder and controller being received to save battery energy in a battery powered application.

The transmitter comprises a mixer, a front-end transmitter/receiver, an antenna embedded on a PCB, and two or more inductors. The mixer is configured to modulate the plurality of sets of binary data characters onto a carrier wave with a carrier phase shifted by 180 degrees whenever a binary data character "0" is transmitted. It should be appreciated that PSK signaling outperforming amplitude-shift keying (ASK) and frequency-shift keying (FSK) can be found in Digital Communication Theory. Owing to simplicity and reduced error probability, the PSK signaling is widely used in wireless local area network (LAN) standard, IEEE 802.11 and IEEE 802.15 using two frequency bands: at 868~915 MHz with binary PSK (BPSK) and at 2.4 GHz with offset quadrature PSK (OQPSK).

In this disclosure, the LED luminaire control system may be adopted to couple to various LED luminaires such as high-power UFO lighting fixtures over 100 watts, sport lighting fixtures over 200 watts, low-power panel lights under 50 watts, LED lamps under 20 watts, etc. with the remote controller to control such LED luminaires to work in controllable on-off and dimming up and down environments without wiring and rewiring.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified. Moreover, in the section of detailed description of the invention, any of a "first", a "second", a "third", and so forth does not necessarily represent a part that is mentioned in an ordinal manner, but a particular one.

DETAILED DESCRIPTION OF THE INVENTION

Figure 1:
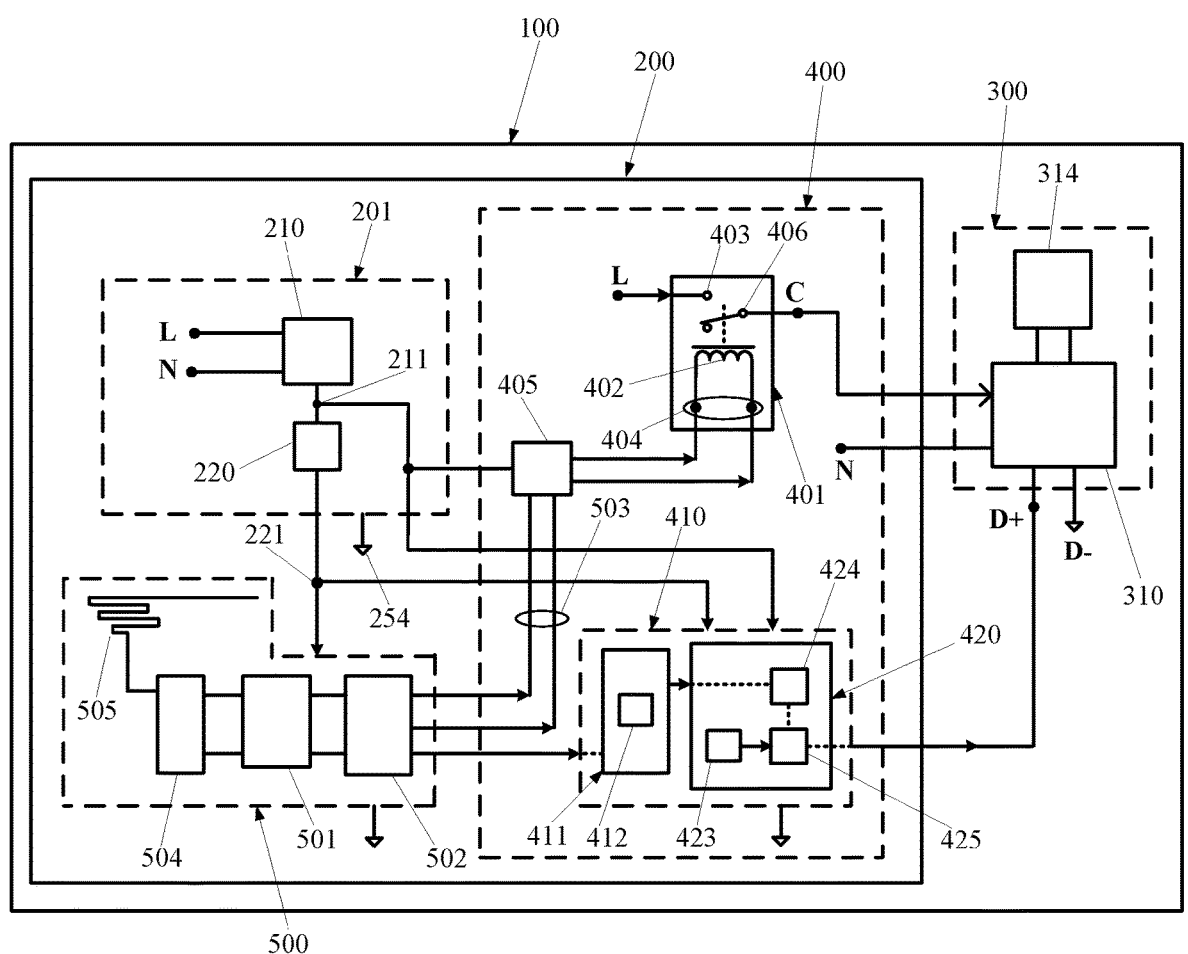
FIG. 1 is a block diagram of an LED luminaire control system according to the present disclosure.

FIG. 1 is a block diagram of an LED luminaire control system according to the present disclosure. In FIG. 1, the integrated LED luminaire 100 comprises a regular luminaire 300 and an LED luminaire control system 200. The regular luminaire 300 comprises one or more LED arrays 314 (external one or more LED arrays 314, hereinafter) and a power supply unit 310 (external power supply unit 310, hereinafter) that may comprise a pair of dimming ports D+D−. The LED luminaire control system 200 comprises a power supply package 201 comprising two electrical conductors "L" and "N", a power supply converter circuit 210, and a first voltage converter circuit 220. The two electrical conductors "L" and "N" are configured to couple to the AC mains. The power supply converter circuit 210 is configured to couple to the two electrical conductors "L" and "N" to convert a line voltage from the AC mains into a first direct-current (DC) voltage at a port 211. The first voltage converter circuit 220 is configured to convert the first DC voltage into a second DC voltage at a port of 221 less than the first DC voltage. Both the first DC voltage and the second DC voltage are with respect to a first ground reference 254. The LED luminaire control system 200 further comprises a control circuit 400 comprising a relay switch 401, which comprises a power sensing coil 402 with a set voltage and a reset voltage and is configured to couple the line voltage from the AC mains to the external power supply unit 310 to operate thereof when enabled, subsequently powering up the external one or more LED arrays 314 coupled with the external power supply unit 310. The external power supply unit 310 comprises an input operating voltage range such as 100~347 volts (AC or DC). The external power supply unit 310 comprises two electrical conductors "C" and "N". The pair of dimming ports D+D− are configured to receive a 1-to-10 V DC voltage for luminaire dimming applications. The external power supply unit 310 is a current source, providing an LED driving current to the external one or more LED arrays 314 to dim up or dim down thereof.

In FIG. 1, the relay switch further comprises a first input electrical terminal 403 and a pair of input electrical terminals 404, in which the first input electrical terminal 403 is configured to couple to a hot wire (i.e., "L") of the line voltage from the AC mains. The pair of input electrical terminals 404 are coupled to the power sensing coil 402 and configured to receive either the set voltage or the reset voltage and to respectively set up an on-state or an off-state of the relay switch 401.

In FIG. 1, the LED luminaire control system 200 further comprises a transceiver circuit 500 comprising a receiver 501 and a decoder and controller 502. The transceiver circuit 500 is coupled to the control circuit 400 and configured to demodulate various phase-shift keying (PSK) band-pass signals and to output either a first pulse signal or a second pulse signal via a pair of ports 503. Either the first pulse signal or the second pulse signal has a low voltage, not powerful enough to operate the power sensing coil 402. The control circuit 400 further comprises a driver circuit 405 powered by the first DC voltage and receiving either the first pulse signal or the second pulse signal. The driver circuit 405 is coupled to the power sensing coil 402 and configured to respectively convert the first pulse signal and the second pulse signal into a third pulse signal and a fourth pulse signal that has a reverse polarity with the third pulse signal. Either the third pulse signal or the fourth pulse signal is boosted to reach a level of either the set voltage or the reset voltage, powerful enough to either set or reset the power sensing coil 402.

In FIG. 1, the relay switch 401 further comprises an output electrical terminal 406 configured to relay the hot wire ("L") of the line voltage from the AC mains to the external power supply unit 310 when the third pulse signal appears at the input electrical terminals 404 to set up the on-state, whereas the relay switch 401 maintains the on-state until the fourth pulse signal is received for the off-state.

In FIG. 1, the transceiver circuit 500 is further configured to output either a pulse-width modulation (PWM) signal or a complementary PWM signal via the decoder and controller 502 in response to one of the various PSK band-pass signals received by the receiver 501. Either the PWM signal or the complementary PWM signal is configured to control the external power supply unit 310 by providing an LED driving current to dim up or dim down the external one or more LED arrays 314. The control circuit 400 further comprises a PWM-to-voltage converter 410 coupled to the transceiver circuit 500 and configured to convert either the PWM signal or the complementary PWM signal into the 1-to-10 V DC voltage in response to one of the various PSK band-pass signals received and to control the external power supply unit 310 by providing an LED driving current to dim up or dim down the external one or more LED arrays 314. The PWM-to-voltage converter 410 comprises a digital-to-analog converter circuit 420 coupled to the external power supply unit 310 and configured to transform either the PWM signal or the complementary PWM signal into the 1-to-10 V DC voltage to operate a dimming circuit in the external power supply unit 310.

The PWM-to-voltage converter 410 further comprises an interface circuit 411 coupled between the transceiver circuit 500 and the digital-to-analog converter circuit 420 and configured to buffer either the PWM signal or the complementary PWM signal in a way that the digital-to-analog converter circuit 420 powered by the first DC voltage can be operated without affecting an operation of the transceiver circuit 500 powered by the second DC voltage. The interface circuit 411 may comprise an inverter 412 configured to convert the complementary PWM signal into the PWM signal. The digital-to-analog converter circuit 420 comprises a low-pass filter assembly 424 receiving the PWM signal and configured to first-order smooth out the PWM signal and to convert the PWM signal into the 1-to-10 V DC voltage according to a proportionality set up by two resisters (not shown). The digital-to-analog converter circuit 420 further comprises a transistor 425 coupled between the low-pass filter assembly 424 and the external power supply unit 310 and configured to couple the 1-to-10 V DC voltage to the external power supply unit 310 when the transistor 425 is turned on. The digital-to-analog converter circuit 420 further comprises a second voltage converter circuit 423 configured to boost the first DC voltage into a third DC voltage greater than the first DC voltage, and wherein the third DC voltage is configured to set up a bias voltage to turn on the transistor 425 in a way that the 1-to-10 V DC voltage is capable of controlling the external power supply unit 310 without affecting an operation of the PWM-to-voltage converter 410.

In FIG. 1, the transceiver circuit 500 further comprises an antenna 505 embedded on a printed circuit board (PCB) and a radio-frequency (RF) front-end transmitter/receiver 504 configured to provide a single-ended matched impedance between an input to the RF front-end transmitter/receiver 504 and an output from the receiver 501 for maximum transmit/receive efficiency. In other words, this important process is designed to ensure signals to transmit without signal reflections and with a required transmission power. The decoder and controller 502 comprises a microcontroller, a microchip, or a programmable logic controller.

Figure 2:
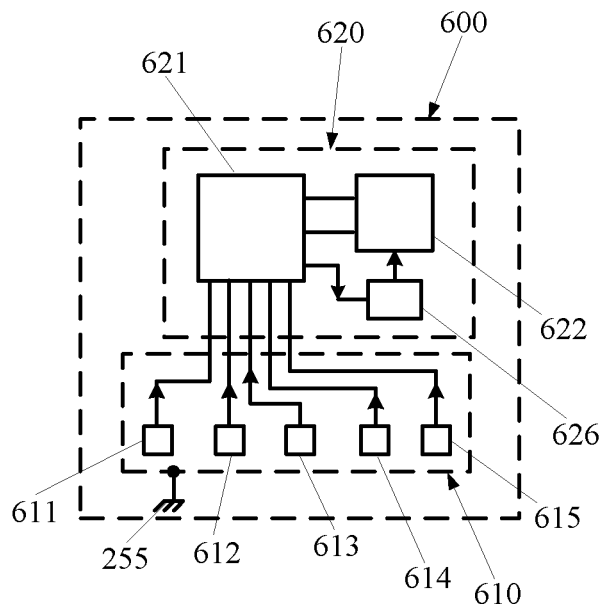
FIG. 2 is a block diagram of a remote controller according to the present disclosure.

FIG. 2 is a block diagram of a remote controller according to the present disclosure. In FIG. 2, the remote controller 600 comprises a remote user interface 610 and a transmitter circuit 620. The remote controller 600 is configured to send the PSK band-pass signals to the transceiver circuit 500 in response to a plurality of signals generated from the remote user interface 610. The transmitter circuit 620 comprises a transmitter 622 and an encoder and controller 621. The encoder and controller 621 is coupled between the remote user interface 610 and the transmitter 622 and configured to convert the plurality of signals into a plurality of sets of binary data characters. Each of the plurality of sets of binary data characters comprises command data.

In FIG. 2, the remote user interface 610 comprises a plurality of touch-sensitive switches 611, 612, 613, 614, and 615, which are configured to provide the plurality of signals with respect to a second ground reference 255. At least one of the plurality of signals is configured to turn on the external one or more LED arrays 314 via the external power supply unit 310. At least one of the plurality of signals is configured to turn off the external one or more LED arrays 314 via the external power supply unit 310. At least one of the plurality of signals is configured to dim up the external one or more LED arrays 314 via the external power supply unit 310. At least one of the plurality of signals is configured to dim down the external one or more LED arrays 314 via the external power supply unit 310. That is to say, at least two of the plurality of signals may be respectively configured to turn on and turn off the external one or more LED arrays 314 via the external power supply unit 310 whereas at least two of the plurality of signals may be respectively configured to dim up and dim down the external one or more LED arrays 314 via the external power supply unit 310. At least one of the plurality of signals is configured as a transponder signal, wherein, upon receiving the transponder signal, the transceiver circuit 500 sends a response signal. The remote controller 600 further comprises a voltage regulator 626 with an enable input, the voltage regulator 626 configured to supply a voltage to operate the transmitter circuit 622 in response to (e.g., only when) an enable signal from the encoder and controller 621 being received to save battery energy in a battery powered application.

Figure 3:
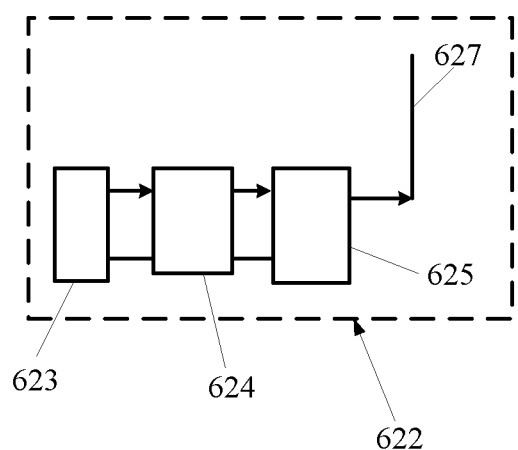
FIG. 3 is a block diagram of a transmitter according to the present disclosure.

FIG. 3 is a block diagram of the transmitter circuit 622 according to the present disclosure. The transmitter circuit 622 comprises a mixer 623, a front-end transmitter/receiver 624, an antenna 627 embedded on a PCB, and two or more inductors 625 interconnected in series. The mixer 623 is configured to modulate the plurality of sets of binary data characters onto a carrier wave with a carrier phase shifted by 180 degrees whenever a binary data character "0" is transmitted. It should be appreciated that PSK signaling outperforming amplitude-shift keying (ASK) and frequency-shift keying (FSK) can be found in Digital Communication Theory. Owing to simplicity and reduced error probability, the PSK signaling is widely used in wireless local area network (LAN) standard, IEEE 802.11 and IEEE 802.15 using two frequency bands: at 868~915 MHz with binary PSK (BPSK) and at 2.4 GHz with offset quadrature PSK (OQPSK).

Figure 4:
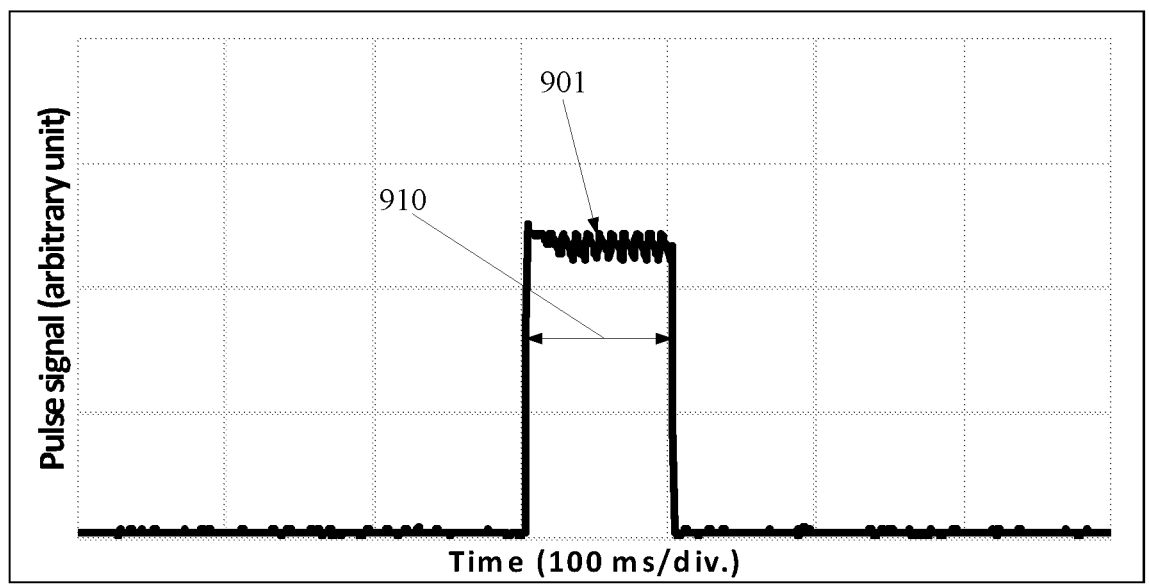
FIG. 4 is an example of the third pulse signal according to the present disclosure.

FIG. 4 is an example of a third pulse signal according to the present disclosure. In FIG. 4, the third pulse signal 901 is shown. The third pulse signal 901 comprises a pulse width 910 of 100 millisecond (ms). The third pulse signal 901 is configured to set the power sensing coil 402 (FIG. 1) so as to turn on power to the external power supply unit 310. The relay switch 401 maintains its on-state until the fourth pulse signal appears at the power sensing coil 402. The fourth pulse signal has its polarity opposite to the third pulse signal 901. In other words, the third pulse signal 901 is configured to trigger the relay switch 401 to change the off-state to the on-state whereas the fourth pulse signal is configured to trigger the relay switch 401 to change the on-state to the off-state. In this sense, the relay switch 401 is bi-stable. When power is turned off, the relay switch 401 remains in its previous state, allowing a single pulse to control the driver circuit 405.

Figure 5:
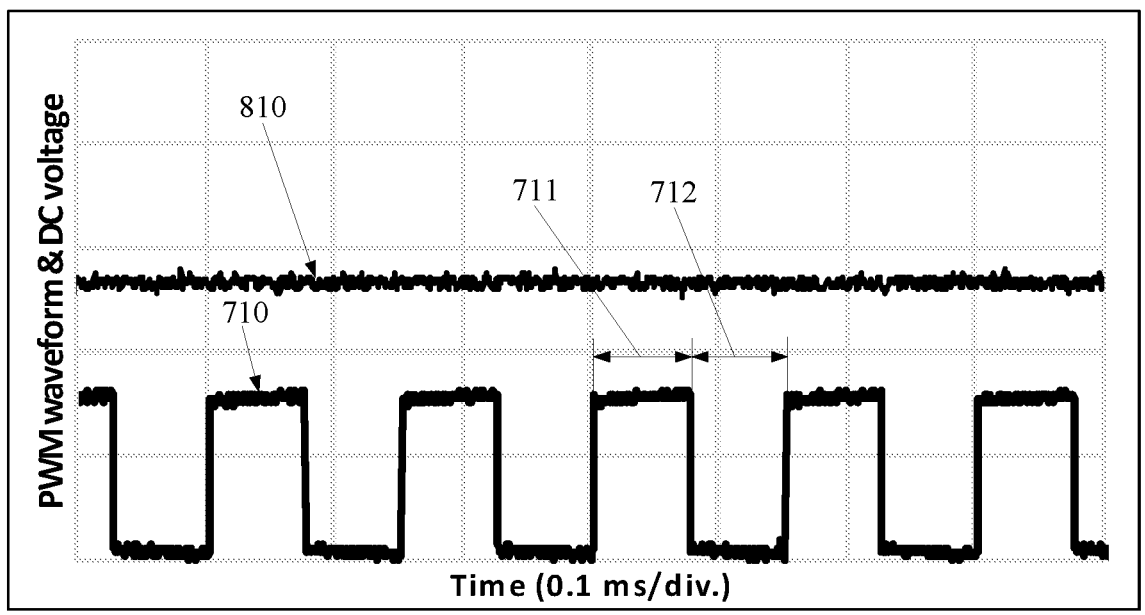
FIG. 5 is an example of a complementary PWM signal according to the present disclosure.

FIG. 5 is an example of a complementary PWM signal according to the present disclosure. In FIG. 5, a complementary PWM signal waveform 710 and a DC voltage 810 extracted from the complementary PWM signal waveform 710 are shown. A logic-high level 711 and a logic-low level 712 respectively represent an on-time and an off-time, which determine a frequency of 6.5 kHz and a duty cycle of 0.5078. When the transceiver circuit 500 (FIG. 1) outputs the complementary PWM signal, the interface circuit 411 that may comprise the inverter 412 can convert the complementary PWM signal into the PWM signal further processed by the digital-to-analog converter circuit 420 to output the 1-to-10 V DC voltage of 4.9 V. In this sense, the complementary PWM signal is an inverse of the PWM signal, respectively converting a low-level voltage "0" and a high-level voltage "1" of the complementary PWM signal into the high-level voltage "1" and the low-level voltage "0" of the PWM signal. The DC voltage of 4.9 V can dim down the one or more LED arrays 314 with an approximate 50% of rated maximum power.

Figure 6:
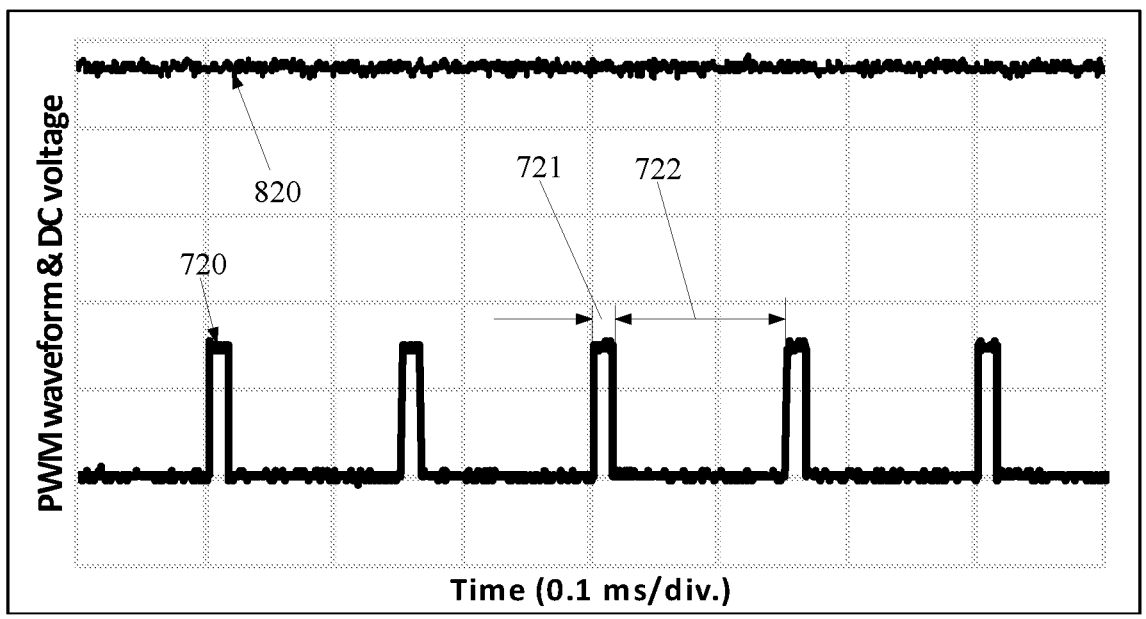
FIG. 6 is another example of a complementary PWM signal according to the present disclosure.

FIG. 6 is another example of a complementary PWM signal according to the present disclosure. In FIG. 6, a complementary PWM signal waveform 720 and a DC voltage 820 extracted from the complementary PWM signal waveform 720 are shown. A logic-high level 721 and a logic-low level 722 respectively represent an on-time and an off-time, which determine a frequency of 6.5 kHz and a duty cycle of 0.1178. The inverter 412 can convert the complementary PWM signal waveform 720 into the PWM signal further processed by the digital-to-analog converter circuit 420 to output the 1-to-10 V DC voltage of 8.8 V. The DC voltage of 8.8 V can dim down the one or more LED arrays 314 with an approximate 88% of rated maximum power.

Whereas preferred embodiments of the present disclosure have been shown and described, it will be realized that alterations, modifications, and improvements may be made thereto without departing from the scope of the following claims. Another kind of schemes with an LED luminaire control system that incorporates remote controls for power switching and luminaire dimming or various kinds of combinations adopted to operate an LED luminaire to accomplish the same or different objectives could be easily adapted for use from the present disclosure. Accordingly, the foregoing descriptions and attached drawings are by way of example only and are not intended to be limiting.

What is claimed is:

1. A light-emitting diode (LED) luminaire control system, comprising:
 a power supply converter circuit configured to be coupled to alternate-current (AC) mains to convert a line voltage from the AC mains into a first direct-current (DC) voltage;
 a first voltage converter circuit configured to convert the first DC voltage into a second DC voltage less than the first DC voltage;
 a control circuit comprising a relay switch, wherein the relay switch comprises a power sensing coil with a set voltage and a reset voltage and is configured to couple the line voltage from the AC mains to an external power supply unit to operate thereof when enabled, subsequently powering up external one or more LED arrays coupled with the external power supply unit; and a transceiver circuit comprising a receiver and a decoder and controller, the transceiver circuit coupled to the control circuit and configured to receive and demodulate various phase-shift keying (PSK) band-pass signals and to output either a first pulse signal or a second pulse signal, wherein:
the relay switch further comprises a first input electrical terminal and a pair of input electrical terminals;
the first input electrical terminal is configured to couple to a hot wire of the line voltage from the AC mains; and
the pair of input electrical terminals are coupled to the power sensing coil and configured to receive either the set voltage or the reset voltage and to respectively set up an on-state or an off-state of the relay switch.

2. The LED luminaire control system of claim 1, wherein the control circuit further comprises a driver circuit powered by the first DC voltage and configured to receive either the first pulse signal or the second pulse signal, wherein the driver circuit is coupled to the power sensing coil and configured to respectively convert the first pulse signal and the second pulse signal into a third pulse signal and a fourth pulse signal that has a reverse polarity with the third pulse signal, and wherein either the third pulse signal or the fourth pulse signal is boosted to reach a level of either the set voltage or the reset voltage to either set or reset the power sensing coil.

3. The LED luminaire control system of claim 2, wherein the relay switch further comprises an output electrical terminal configured to relay the hot wire of the line voltage from the AC mains to the external power supply unit when the third pulse signal appears at the pair of input electrical terminals to set up the on-state, and wherein the relay switch maintains the on-state until the fourth pulse signal is received for the off-state.

4. The LED luminaire control system of claim 2, wherein the control circuit further comprises a pulse-width modulation (PWM)-to-voltage converter coupled to the transceiver circuit and configured to convert either a PWM signal or a complementary PWM signal into a 1-to-10 V (volt) DC voltage to control the external power supply unit by providing an LED driving current to dim up or dim down the external one or more LED arrays.

5. The LED luminaire control system of claim 4, wherein the transceiver circuit is further configured to output either the PWM signal or the complementary PWM signal in response to one of the various PSK band-pass signals received.

6. The LED luminaire control system of claim 4, wherein the PWM-to-voltage converter comprises a digital-to-analog converter circuit coupled to the external power supply unit and configured to transform either the PWM signal or the complementary PWM signal into the 1-to-10 V DC voltage to operate a dimming circuit in the external power supply unit.

7. The LED luminaire control system of claim 6, wherein the PWM-to-voltage converter further comprises an interface circuit coupled between the transceiver circuit and the digital-to-analog converter circuit and configured to buffer either the PWM signal or the complementary PWM signal in a way that the digital-to-analog converter circuit powered by the first DC voltage is operated without affecting an operation of the transceiver circuit powered by the second DC voltage.

8. The LED luminaire control system of claim 7, wherein the interface circuit comprises an inverter configured to convert the complementary PWM signal into the PWM signal.

9. The LED luminaire control system of claim 8, wherein the digital-to-analog converter circuit comprises a low-pass filter assembly configured to receive the PWM signal and further configured to convert the PWM signal into the 1-to-10 V DC voltage.

10. The LED luminaire control system of claim 9, wherein the digital-to-analog converter circuit further comprises a transistor coupled between the low-pass filter assembly and the external power supply unit and configured to couple the 1-to-10 V DC voltage to the external power supply unit when the transistor is turned on.

11. The LED luminaire control system of claim 10, wherein the digital-to-analog converter circuit further comprises a second voltage converter circuit configured to convert the first DC voltage into a third DC voltage greater than the first DC voltage, and wherein the third DC voltage is configured to set up a bias voltage to turn on the transistor in a way that the 1-to-10 V DC voltage is applied to the external power supply unit without affecting an operation of the PWM-to-voltage converter.

12. The LED luminaire control system of claim 1, wherein the decoder and controller comprises a microcontroller, a microchip, or a programmable logic controller.

13. The LED luminaire control system of claim 1, further comprising:
a remote controller comprising a remote user interface and a transmitter circuit, the remote controller configured to send the PSK band-pass signals to the transceiver circuit in response to a plurality of signals from the remote user interface, wherein the transmitter circuit comprises a transmitter and an encoder and controller coupled between the remote user interface and the transmitter and configured to convert the plurality of signals into a plurality of sets of binary data characters, and wherein each of the plurality of sets of binary data characters comprises command data.

14. The LED luminaire control system of claim 13, wherein the transmitter comprises a mixer and two or more inductors, and wherein the mixer is configured to modulate the plurality of sets of binary data characters onto a carrier wave with a carrier phase shifted by 180 degrees whenever a binary data character of "0" is transmitted.

15. The LED luminaire control system of claim 13, wherein the transmitter circuit further comprises a voltage regulator with an enable input, the voltage regulator configured to supply a voltage to operate the transmitter responsive to an enable signal from the encoder and controller being received to save battery energy in a battery powered application.

16. The LED luminaire control system of claim 13, wherein the remote user interface comprises a plurality of touch-sensitive switches configured to generate the plurality of signals.

17. The LED luminaire control system of claim 13, wherein at least two of the plurality of signals are respectively configured to turn on and to turn off the external one or more LED arrays via the external power supply unit.

18. The LED luminaire control system of claim 13, wherein at least two of the plurality of signals are respectively configured to dim up and dim down the external one or more LED arrays via the external power supply unit.

19. The LED luminaire control system of claim 13, wherein at least one of the plurality of signals functions as a transponder signal, and wherein, upon receiving the transponder signal, the transceiver circuit sends a response signal.

\* \* \* \* \*